United States Patent Office 3,262,861
Patented July 26, 1966

3,262,861
METHOD FOR PRODUCING L-ISOLEUCINE BY FERMENTATION PROCESS
Shukuo Kinoshita, Tokyo, Hirotoshi Samejima and Kunizo Mizuhara, Machida-shi, Takashi Nara, Tokyo, and Masanaru Misawa, Kawasaki-shi, Japan, assignors to Kyowa Hakko Kogyo Co., Ltd., Tokyo, Japan, a corporation of Japan
No Drawing. Filed May 5, 1965, Ser. No. 453,477
Claims priority, application Japan, Nov. 18, 1960, 35/45,347
17 Claims. (Cl. 195—29)

This application is a continuation-in-part of application Serial No. 128,693 filed August 2, 1961, and application Serial No. 281,769 filed May 20, 1963 (now abandoned).

The present invention relates to a method for producing L-isoleucine by fermentation. More particularly, it relates to a method for producing L-isoleucine by a fermentation process wherein a specific microorganism is cultivated in a culture medium to accumulate a remarkable amount of L-isoleucine in the medium. The L-isoleucine is then recovered by separation from the medium.

L-isoleucine is one of the essential amino acids. Various research on the production of this amino acid by fermentation has led to the cultivation of the following L-isoleucine-producing bacteria: *Bacillus subtilis* No. 14 (Amino Acids, 1, 89 [1959], published by the Symposium of Amino Acids Fermentation of Japan); *Bacillus subtilis* No. 14–2 and No. 14–545; *Serratia marcescens*; *Erwinia carotovora*; *Aerobacter aerogenes*; *Pseudomonas aureofaciens* (ibid., 2, 100 [1960]); *Pseudomonas aeruginosa*; and *Pseudomonas fluorescens* (ibid., 2, 90 [1960]).

The inventors have studied various amino acid fermentations, especially L-isoleucine fermentation, and now have succeeded in isolating microorganisms which accumulate a remarkable amount of L-isoleucine in a medium, whereby commercial production of L-isoleucine by use of the microorganisms has been established.

An object of the invention is to provide a novel method for producing L-isoleucine which can be adapted to a commercial scale plant. Another object of the invention is to provide a method for producing L-isoleucine in which a large number of microorganisms are available. Other objects and advantages will be apparent from the following description.

The isoleucine producing bacteria employed in the present invention include strains of bacteria selected from the species *Pseudomonas ovalis*, *Brevibacterium ammoniagenes*, *Paracolobactrum aerogenoides*, *Escherichia coli*, *Streptomyces flaveolus* and *Micrococcus glutamicus*, and mutants thereof. The fact that these microorganisms produce L-isoleucine was not previously known.

Among these microorganisms, the bacteriological properties of *Micrococcus glutamicus* were reported in the specification of Japanese Patent No. 243,382 and the Bulletin of the Agricultural Chemical Society of Japan 22, 176 (1958). The term "mutant" means a strain varying in required nutrient, which can be produced by treating the microorganism to cause mutation, for example by a treatment with ultraviolet ray, X-ray, γ-ray, or a chemical reagent. For instance, the microorganisms listed below have a powerful L-isoleucine producing ability.

*Micrococcus glutamicus* 534–Co146 (requiring methionine) ATCC No. 14308
*Micrococcus glutamicus* 534–Co147 (requiring threonine) ATCC No. 14296
*Micrococcus glutamicus* 615–430 (requiring threonine) ATCC No. 14312

*Micrococcus glutamicus* 534–106 (requiring leucine) ATCC No. 14310
*Micrococcus glutamicus* 534–112 (requiring leucine) ATCC No. 14309
*Micrococcus glutamicus* 613–211 (requiring leucine) ATCC No. 14311

Thus, the present invention provides a method for producing L-isoleucine, wherein an L-isoleucine-producing strain of bacterium selected from those species listed above, is cultivated under suitable cultivation conditions to accumulate a remarkable amount of L-isoleucine in the cultivation liquor, and, then, the L-isoleucine is recovered by isolation from the liquor. These microorganisms accumulate almost entirely L-isoleucine in the cultivation liquor with but little other amino acids, so that the L-isoleucine can be recovered by separation with commercial advantages.

In a particularly preferred aspect the instant invention relates to a method for the production of L-isoleucine wherein one of the following L-isoleucine producing strains of bacterium is cultivated under suitable cultivation conditions to accumulate a remarkable amount of L-isoleucine:

*Micrococcus glutamicus* ATCC No. 14308
*Micrococcus glutamicus* ATCC No. 14296
*Micrococcus glutamicus* ATCC No. 14312
*Micrococcus glutamicus* ATCC No. 14310
*Micrococcus glutamicus* ATCC No. 14309
*Paracolobactrum aerogenoides* ATCC No. 11604
*Streptomyces flaveolus* ATCC No. 3319
*Micrococcus glutamicus* ATCC No. 14311
*Brevibacterium ammoniagenes* ATCC No. 6871
*Escherichia coli* I.A.M.–2
*Pseudomonas ovalis* I.A.M. Bact. 7–2

Either a synthetic culture medium or a complex culture medium may be employed for cultivation in the present invention, as long as it properly contains a carbon source available to the bacterium used, a nitrogen source, mineral materials, and other nutrients necessary for growth of the bacteria.

Carbohydrates, such as glucose, fructose, mannose, galactose, sucrose, maltose, glycerol, mannitol, starch hydrolyzate, molasses, etc., as well as organic acids, such as acetic acid and fumaric acid, may be employed as the carbon source.

Ammonia; various inorganic and organic ammonium salts, such as ammonium sulfate, chloride, nitrate, phosphate, carbonate, acetate, etc.; various nitric acid salts; urea; and other nitrogen-containing material; as well as peptone; NZ-amine; meat extract; yeast extract; corn steep liquor; and hydrolyzates of various proteins, such as casein, fish meal, soy bean cake, chrysalis, a fermentation residue, and the like, may be employed as the nitrogen source.

As mineral materials, potassium monohydrogen phosphate, potassium dihydrogen phosphate, magnesium sulfate, calcium carbonate, ferric chloride and others, may be employed.

When a microorganism employed is a mutant requiring a particular nutrient, it is necessary that an adequate amount of the nutrient required for the growth of the microorganism be present in the culture medium. Particularly when using a synthetic medium, an amount of the nutrient, or a material containing same, required for growth has to be added. When using a complex medium containing a natural nitrogen source, however, such addition is not ordinarily essential since natural organic nitrogen sources generally contain the necessary nutrients. Also, α-amino-butyric acid, preferably from about 0.5 to 3% w./v., i.e., grams per 100 milliliters of medium, is incorporated in the medium to assure production of a remarkable amount of L-isoleucine, the former being a precursor of the latter.

The carbon source, the nitrogen source, the mineral materials, the other nutrients, and the precursor, as mentioned above, may be added to the medium all at once at the commencement of the cultivation, or they may be added continuously or intermittently during the course of the cultivation.

The cultivation is carried out aerobically, for example, with shaking or with stirring by aeration. The cultivation temperature varies, depending upon the kind of bacteria employed, but it is preferably in the range between 24° and 37° C. The period for the cultivation is generally 2 to 7 days, within which a remarkable amount of L-isoleucine is accumulated in the cultivation liquor.

After the termination of the cultivation, the cultivation liquor is filtered, and the filtrate is treated according to any of the known processes to separate L-isoleucine. For instance, the filtrate is passed through an ion exchange resin to adsorb L-isoleucine, and the resin is eluted, followed by concentration of the eluate. After cooling of the concentrate, crude crystalline L-isoleucine isolated from the solution is separated, which may be recrystallized, if necessary, to give purified crystalline L-isoleucine.

The present invention is more fully explained with respect to the following examples, which are provided merely by way of illustration, and not by way of limitation. Unless otherwise specified, all percentages are based upon parts by weight per 100 parts by volume, the relationship between parts by weight and parts by volume being the same as that between grams and milliliters.

*Example 1*

One loop of solid cells of *Brevibacterium ammoniagenes* (ATCC No. 6871) taken from an agar slant medium is inoculated to 10 ml. of a seed culture medium containing 1% of glucose, 1% of peptone, 1% of meat extract, and 0.5% of sodium chloride and having a pH of 7.0. Cultivation is effected at 30° C. for 24 hours on a test tube shaker. A 0.3 ml. portion of the resulting fermented liquor is seeded to 6 ml. of a fermentation medium comprising 10% of glucose, 2% of ammonium sulfate, 0.6% of peptone, 1% of α-aminobutyric acid, 2.5% of calcium carbonate, 10γ/liter of biotin, 0.1% of potassium monohydrogen phosphate, and 0.03% of magnesium sulfate (heptahydrate), and cultivated at 30° C. for 96 hours under shaking.

The resulting cultivated liquor contains 8.82 mg./ml. of L-isoleucine. There are little by-produced amino acids in the liquor, excepting a small amount of α-aminobutyric acid.

*Example 2*

A cultivation is carried out as in Example 1, excepting that *Micrococcus glutamicus* 615–430 (ATCC No. 14312) (threonine-requiring mutant) and a fermentation medium containing 10% of glucose, 2% of ammonium sulfate, 2.5% of calcium carbonate, 0.1% of potassium monohydrogen phosphate, 0.03% of magnesium sulfate (heptahydrate), 1.5% of NZ-amine, 10γ/liter of biotin, and 1.0% of α-aminobutyric acid (pH 7.0) are used. After 96 hours, the cultivation liquor contains 10.7 mg./ml. of L-isoleucine.

*Example 3*

A cultivation is carried out as in Example 1, excepting that *Micrococcus glutamicus* 534–106 (ATCC No. 14310) (leucine-requiring mutant) and a fermentation medium containing 10% of glucose, 2% of ammonium sulfate, 2.5% of calcium carbonate, 0.1% of potassium monohydrogen phosphate, 0.03% of magnesium sulfate (heptahydrate), 10γ/liter of biotin, 1% of α-aminobutyric acid, and 300γ/ml. of L-isoleucine (pH 8.0) are used. After 96 hours, the cultivation liquor contains 8.55 mg./ml. of L-isoleucine.

When the amount of α-aminobutyric acid in the fermentation medium of the above-mentioned process is increased to 1.5%, the amount of L-isoleucine produced in the cultivation liquor is 9.7 mg./ml.

*Example 4*

A cultivation is carried out as in Example 1, excepting that *Micrococcus glutamicus* 534–Co–147 (ATCC No. 14296) (threonine-requiring mutant; a homoserine-producing bacterium) and a fermentation medium containing 5% of cane sugar, 1.5% ammonium sulfate, 2% of calcium carbonate, 0.1% of potassium monohydrogen phosphate, 0.03% of magnesium sulfate (heptahydrate), 1% of α-aminobutyric acid, 7.5γ/liter of biotin, and 400γ/ml. of L-isoleucine, are used. After 96 hours, the cultivation liquor contains 7.0 mg./ml. of L-isoleucine.

*Example 5*

A cultivation is carried out as in Example 1, excepting that *Escherichia coli* (I.A.M.–2) and a fermentation medium containing 7.5% of glucose, 1.0% of NZ-amine, 1.5 to 2.0% of ammonium sulfate, 0.1% of potassium monohydrogen phosphate, 0.03% of magnesium sulfate (heptahydrate), 2% of calcium carbonate, and 1% of α-aminobutyric acid (pH 7.0 to 7.5) are used. After 96 hours, the cultivation liquor contains 7.5 mg./ml. of L-isoleucine with but little contaminating amino acids.

*Example 6*

A cultivation is carried out as in Example 1, excepting that *Streptomyces flaveolus* (ATCC No. 3319) and a fermentation medium containing 5% of glucose, 1% of ammonium chloride, 0.1% of potassium monohydrogen phosphate, 0.03% of magnesium sulfate (heptahydrate), 13 mg./liter of ferrous sulfate, 1% of calcium carbonate, and 0.6% of α-aminobutyric acid (pH 7.0) are used. After 96 hours, the cutivation liquor contains 3 mg./ml. of L-isoleucine.

*Example 7*

Three liters of a fermentation medium containing 10% of glucose, 2% of ammonium sulfate, 2.5% of calcium carbonate, 0.1% of potassium monohydrogen phosphate, 0.03% of magnesium sulfate (heptahydrate), 1.5% of NZ-amine, 10γ/liter of biotin, and 1.5% of a-aminobutyric acid (pH 7) are placed in a 5-liter fermentation tank and sterilized. After cooling, a cultivated seed of *Micrococcus glutamicus* 615–430 (ATCC No. 14312) (threonine-requiring-mutant) is inoculated. After the commencement of the cultivation, 0.7% glucose (aqueous) solutions are supplied three times (at every 24 hours), and the cultivation is carried out at 30° C. for 5 days under stirring by aeration. The amount of L-isoleucine produced in the cultivation liquor is 14.5 mg./ml.

Three liters of the cultivation liquor are filtered, and the filtrate is passed through a cation exchange resin (Diaion SK No. 1) to absorb L-isoleucine to the resin. After elution of the resin, the eluate is concentrated. After cooling the concentrate, 41 g. of crude crystalline L-isoleucine are obtained.

*Example 8*

*Micrococcus glutamicus* No. 534–Co–146 (ATCC No. 14308) (methionine-requiring-mutant) is inoculated to medium containing 10% of glucose, 2% of ammonium sulfate, 2.5% of calcium carbonate, 0.1% of potassium dihydrogenphosphate, 0.03% of magnesium sulfate (heptahydrate), 10γ/liter of biotin, 0.8% of α-aminobutyric acid and 400 γ/ml. of D,L-methionine. Cultivation is carried out as described in Example 1 and 4.2 mg./ml. of L-isoleucine are produced in the broth after 96 hours cultivation.

*Example 9*

*Micrococcus glutamicus* No. 534–112 (ATCC No. 14309) (leucine-requiring-mutant) is inoculated to the medium of Example 3, and cultivation is carried out also as in Example 3. The amount of L-isoleucine in the broth after 96 hours cultivation is 7.61 mg./ml.

Example 10

*Micrococcus glutamicus* No. 613–211 (ATCC No. 14311) (leucine-requiring-mutant) is inoculated to the medium as for Example 3, and cultivation is carried out also as in Example 3. The amount of produced L-isoleucine in the broth after 96 hours' cultivation is 6.35 mg./ml.

Example 11

The amounts of L-isoleucine produced by exemplary other bacteria are listed in the following table.

| Strains used: | L-isoleucine produced, mg./ml. |
|---|---|
| *Pseudomonas ovalis* I.A.M. Bact. 7–2 | 400 |
| *Paracolobactrum aerogenoides* (ATCC No. 11604) | 4.25 |

A fermentation medium for these bacteria consists of 10% of glucose, 0.2% of meat extract, 0.2% of peptone, 0.03% of magnesium sulfate (heptahydrate), 0.1% of dihydrogenphosphate, 0.005% of ferric chloride (hexahydrate), 0.5% of urea and 1% of α-aminobutyric acid. Cultivation is carried out as described in Example 1. Analyses for L-isoleucine are made for 4-day culture broth.

What we claim is:

1. A method of producing L-isoleucine by fermentation which comprises cultivating an L-isoleucine producing strain of *Micrococcus glutamicus* in a culture medium containing α-aminobutyric acid, whereby L-isoleucine is accumulated in the medium in significant quantity, and recovering the L-isoleucine from said medium.

2. A method of producing L-isoleucine by fermentation which comprises cultivation of an L-isoleucine producing strain of *Streptomyces flaveolus* in a culture medium containing α-aminobutyric acid, whereby L-isoleucine is accumulated in the medium in significant quantity, and recovering the L-isoleucine from said medium.

3. A method of producing L-isoleucine by fermentation which comprises cultivating an L-isoleucine producing strain of *Escherichia coli* in a culture medium containing α-aminobutyric acid, whereby L-isoleucine is accumulated in the medium in significant quantity, and recovering the L-isoleucine from said medium.

4. A method of producing L-isoleucine by fermentation which comprises cultivating an L-isoleucine producing strain of *Paracolobactrum aerogenoides,* in a culture medium containing α-aminobutyric acid, whereby L-isoleucine is accumulated in the medium in significant quantity, and recovering the L-isoleucine from said medium.

5. A method of producing L-isoleucine by fermentation which comprises cultivating an L-isoleucine producing strain of *Brevibacterium ammoniagenes* in a culture medium containing α-aminobutyric acid, whereby L-isoleucine is accumulated in the medium in significant quantity, and recovering the L-isoleucine from said medium.

6. A method of producing L-isoleucine by fermentation which comprises cultivating an L-isoleucine producing strain of *Pseudomonas ovalis* in a culture medium containing α-aminobutyric acid, whereby L-isoleucine is accumulated in the medium in significant quantity, and recovering the L-isoleucine from said medium.

7. A method of producing L-isoleucine by fermentation which comprises cultivating *Pseudomonas ovalis* I.A.M. Bact. 7–2 in a culture medium containing α-aminobutyric acid, whereby L-isoleucine is accumulated in the medium in significant quantity and recovering the L-isoleucine from said medium.

8. A method of producing L-isoleucine by fermentation which comprises cultivating *Brevibacterium ammoniagenes* ATCC No. 6871 in a culture medium containing α-aminobutyric acid, whereby L-isoleucine is accumulated in the medium in significant quantity, and recovering the L-isoleucine from said medium.

9. A method of producing L-isoleucine by fermentation which comprises cultivating *Paracolobactrum aerogenoides* ATCC No. 11604 in a culture medium containing α-aminobutyric acid, whereby L-isoleucine is accumulated in the medium in significant quantity, and recovering the L-isoleucine from said medium.

10. A method of producing L-isoleucine by fermentation which comprises cultivating *Escherichia coli* I.A.M.–2 in a culture medium containing α-aminobutyric acid, whereby L-isoloeucine is accumulated in the medium in significant quantity, and recovering the L-isoleucine from said medium.

11. A method of producing L-isoleucine by fermentation which comprises cultivating *Streptomyces flaveolus* ATCC No. 3319 in a culture medium containing α-aminobutyric acid, whereby L-isoleucine is accumulated in the medium in significant quantity, and recovering the L-isoleucine from said medium.

12. A fermentative production of L-isoleucine which comprises cultivating *Micrococcus glutamicus* ATCC No. 14308 in a culture medium containing methionine and α-aminobutyric acid, whereby L-isoleucine is accumulated in the medium, and recovering the L-isoleucine from the medium.

13. A fermentative production of L-isoleucine which comprises cultivating *Micrococcus glutamicus* ATCC No. 14296 in a culture medium containing threonine and α-aminobutyric acid, whereby L-isoleucine is accumulated in the medium, and recovering the L-isoleucine from the medium.

14. A fermentative production of L-isoleucine which comprises cultivating *Micrococcus glutamicus* ATCC No. 14312 in a culture medium containing threonine and α-aminobutyric acid, whereby L-isoleucine is accumulated in the medium, and recovering the L-isoleucine from the medium.

15. A fermentative production of L-isoleucine which comprises cultivating *Micrococcus glutamicus* ATCC No. 14310 in a culture medium containing leucine and α-aminobutyric acid, whereby L-isoleucine is accumulated in the medium, and recovering the L-isoleucine from the medium.

16. A fermentative production of L-isoleucine which comprises cultivating *Micrococcus glutamicus* ATCC No. 14309 in a culture medium containing leucine and α-aminobutyric acid, whereby L-isoleucine is accumulated in the medium, and recovering the L-isoleucine from the medium.

17. A fermentative production of L-isoleucine which comprises cultivating *Micrococcus glutamicus* ATCC No. 14311 in a culture medium containing leucine and α-aminobutyric acid, whereby L-isoleucine is accumulated in the medium, and recovering the L-isoleucine from the medium.

References Cited by the Examiner

UNITED STATES PATENTS

| 3,041,247 | 6/1962 | Shimura et al. | 195—29 |
| 3,058,888 | 10/1962 | Chibata et al. | 195—29 |

OTHER REFERENCES

Hayashibe et al.: Agricultural and Biological Chemistry (Japan) vol. 26, No. 2 (1962), pp. 82–88.

A. LOUIS MONACELL, *Primary Examiner.*

L. M. SHAPIRO, *Assistant Examiner.*